AUTOMATIC CONTROL SYSTEM FOR HYDROSTATIC DRIVE

Original Filed Sept. 14, 1970 5 Sheets-Sheet 1

INVENTORS
RONALD L. SISSON
WAYNE R. HOWARD
BY Robert Johnson
ATTORNEY

AUTOMATIC CONTROL SYSTEM FOR HYDROSTATIC DRIVE

Original Filed Sept. 14, 1970 5 Sheets-Sheet 2

INVENTORS
RONALD L. SISSON
WAYNE R. HOWARD
BY Robert H. Johnson
ATTORNEY

AUTOMATIC CONTROL SYSTEM FOR HYDROSTATIC DRIVE

Original Filed Sept. 14, 1970 5 Sheets-Sheet 5

INVENTORS
RONALD L. SISSON
WAYNE R. HOWARD
BY Robert H. Johnson
ATTORNEY

AUTOMATIC CONTROL SYSTEM FOR HYDROSTATIC DRIVE

Original Filed Sept. 14, 1970 5 Sheets-Sheet 4

INVENTORS
RONALD L. SISSON
WAYNE R. HOWARD
BY Robert H. Johnson
ATTORNEY

AUTOMATIC CONTROL SYSTEM FOR HYDROSTATIC DRIVE

Original Filed Sept. 14, 1970 5 Sheets-Sheet 5

INVENTORS
RONALD L. SISSON
WAYNE R. HOWARD
BY Robert H. Johnson
ATTORNEY

United States Patent Office

Re. 28,113
Reissued Aug. 13, 1974

28,113
AUTOMATIC CONTROL SYSTEM FOR HYDROSTATIC DRIVE

Wayne B. Howard and Ronald L. Sisson, Jackson, Mich., assignors to Clark Equipment Co.

Original No. 3,636,705, dated Jan. 25, 1972, Ser. No. 71,704, Sept. 14, 1970. Application for reissue Sept. 27, 1973, Ser. No. 401,477
Int. Cl. F16h *39/46*
U.S. Cl. 60—447 22 Claims

Matter enclosed in heavy brackets [ ] appears in the original patent but forms no part of this reissue specification; matter printed in italics indicates the additions made by reissue.

ABSTRACT OF THE DISCLOSURE

An automatic control system for use with a hydrostatic drive having a variable displacement fluid pump drivingly connected to an engine. The control system includes a spring mechanism connected to the pump for returning the pump to its zero displacement position and mechanism connected to the pump and responsive to engine speed for actuating the pump away from its zero displacement position.

BACKGROUND OF THE INVENTION

The field of art to which this invention relates includes power plants, and more specifically controls for rotary fluid transmissions. A principal object of our invention is to provide an improved control system which is simple, low cost and provides for smooth operation of the associated hydrostatic drive in the various modes of operation of the hydrostatic drive.

Another object of our invention is to provide a control system which automatically responds to output torque demand.

SUMMARY OF THE INVENTION

In carrying out our invention in a preferred embodiment, we provide an automatic control for use with a hydrostatic drive having an engine driven variable displacement pump. The control includes a spring mechanism for biasing the pump to its zero displacement position and a mechanism responsive to engine speed for actuating the pump away from its zero displacement position.

The above and other objects, features and advantages of our invention will be more readily understood when the following detailed description is taken in conjunction with the drawing.

DETAILED DESCRIPTION OF THE PREFERRED EMBODIMENT

Figure 1:
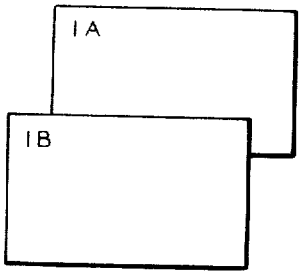
FIG. 1 shows the orientation of FIGS. 1A and 1B to form a complete schematic diagram of our novel control system.
Figure 1A:
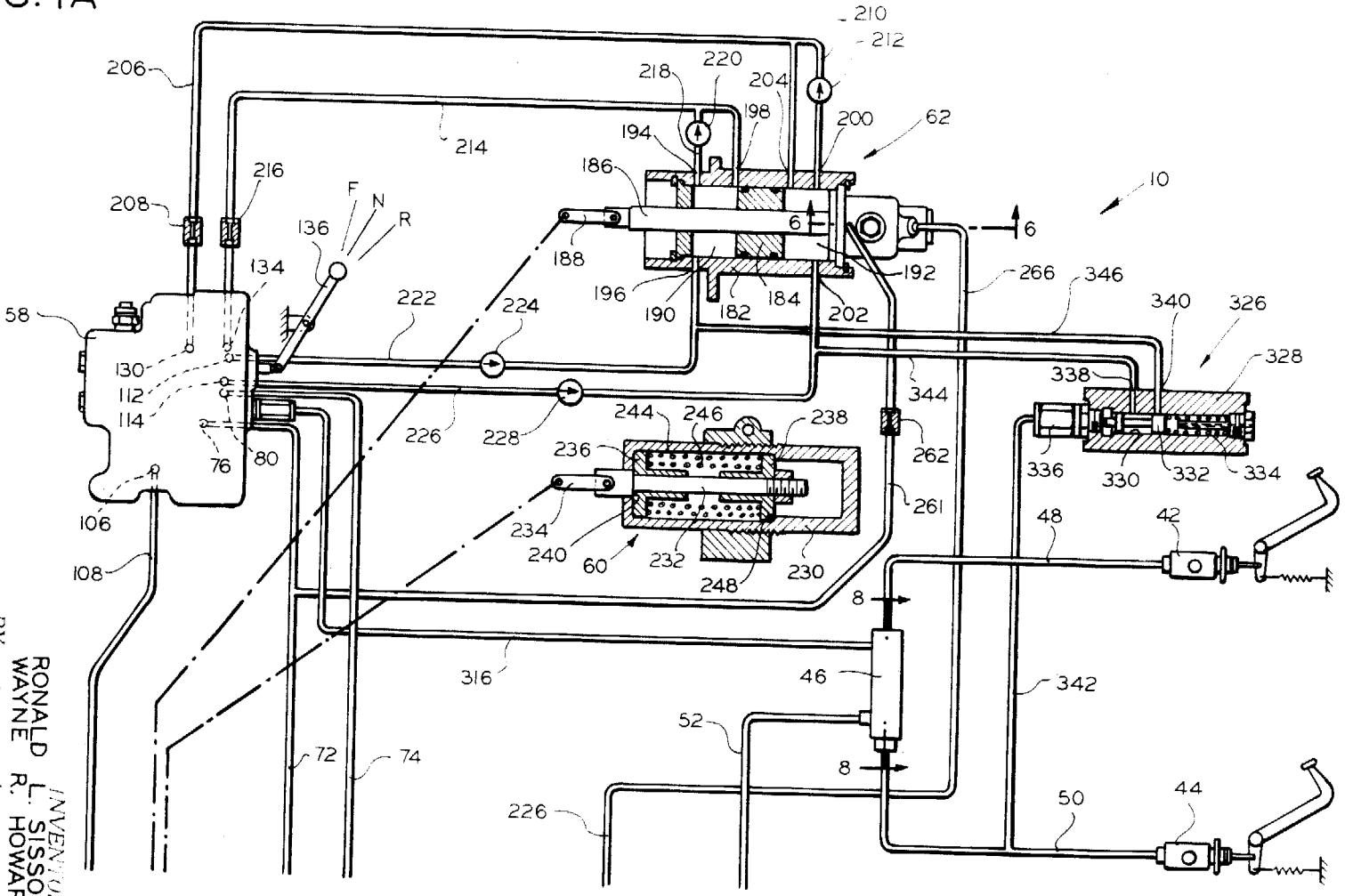
FIG. 1A shows a portion of the schematic diagram of our novel control system.
Figure 1B:
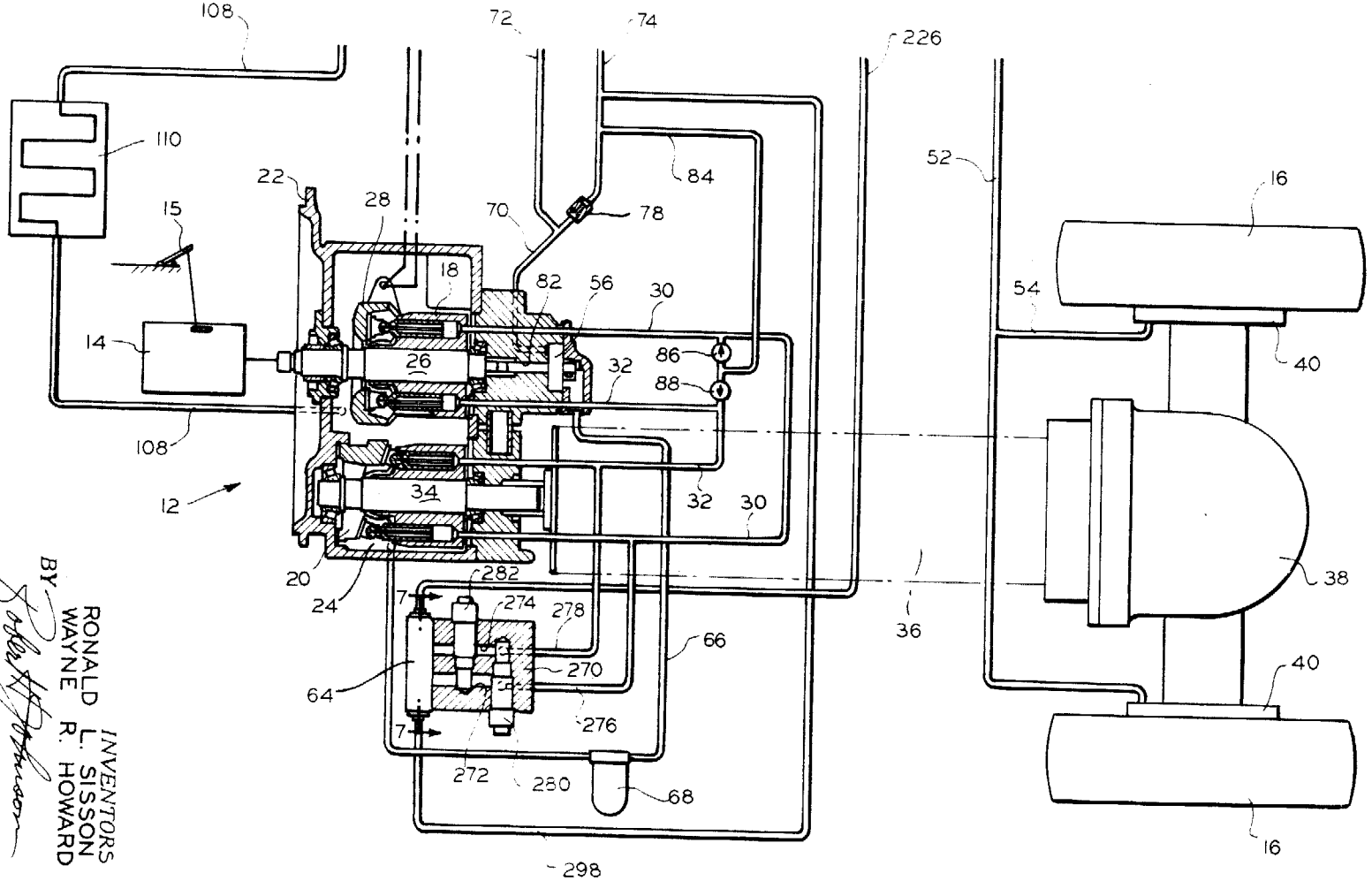
FIG. 1B shows another portion of the schematic diagram of our novel control system.

Referring to FIGS. 1A and 1B, the reference numeral 10 denotes generally a control system associated with a hydrostatic drive 12 which transmits power from an engine 14 to a pair of drive wheels 16.

Hydrostatic drive 12 includes a conventional variable displacement axial piston pump 18 and a conventional fixed displacement axial piston motor 20, both of which are disposed in a housing 22 which also serves as a fluid reservoir 24. Pump 18 which is a main or power pump includes a shaft 26 drivingly connected to engine 14 and a swash plate or similar movable member 28 which when actuated serves to vary the displacement of the pump and is designed to inherently return to its zero displacement position with a force which increases as swash plate 28 is actuated away from its zero displacement position. A further inherent characteristic of pump 18 is that as the load imposed on pump 18 by motor 20 increases, the force which tends to return swash plate 28 to its zero displacement position also increases. Pump 18 is connected to fluid motor 20 by means of a pair of fluid conduits 30 and 32 which serve to supply pressurized fluid generated by pump 18 to motor 20. Motor 20 includes a shaft 34 which is connected by means of a propeller shaft 36 to a drive axle 38 and hence to drive wheels 16 which are mounted for rotation on the ends of axle 38. At this point it will be clear that power generated by engine 14 is transmitted to pump 18 and hence via conduits 30 and 32 to motor 20 and from there to drive wheel 16 via propeller shaft 36 and drive axle 38.

Mounted at the end of drive axle 38 is a pair of brakes 40 of any suitable type which serve to hold wheels 16 from rotation relative to axle 38. Brakes 40 form a part of a brake system which includes a pedal actuated master cylinder 42 and a pedal actuated master cylinder 44. Master cylinders 42 and 44 are connected to a combined junction block and sequencing valve 46 by means of fluid conduits 48 and 50, respectively. Combined junction block and sequencing valve 46 is connected to brakes 40 by means of conduits 52 and 54. Thus, actuation of either master cylinder 42 or 44 generates pressurized fluid which is directed to brakes 40, causing them to be applied.

Control system 10 includes a control pump 56, a control valve cover plate 58 (see FIG. 2 for details), a spring loaded mechanism 60 connected to swash plate 28 for resiliently biasing the swash plate to its zero displacement position, a double-acting fluid motor 62 connected to swash plate 28 for actuating the swash plate away from its zero displacement position as the speed of engine 14 and thus the output of pump 56 increases, and a valve 64 which serves to short circuit fluid motor 20.

Control pump 56 has the inlet thereof connected to fluid reservoir 24 in housing 22 by means of a suction line or conduit 66 in which a filter 68 is disposed. Connected to the outlet of control pump 56 is a conduit 70 which divides into a branch 72 and a branch 74. Branch 72 is connected to a port 76 of cover plate 58 and branch 74 has disposed therein a fluid flow restriction 78 and is connected to a port 80 in cover plate 58. Control pump 56 also includes a shaft 82 which is directly connected to shaft 26 of pump 18 and hence engine 14 so that the volumetric output of pump 56 varies in direct proportion to the speed of engine 14. Also connected to conduit branch 74 is a conduit 84 which communicates with conduits 30 and 32 via a pair of one-way valves 86 and 88 so that the power circuit including pump 18, motor 20 and fluid conduit 30 and 32 is maintained filled with fluid.

Figure 2:
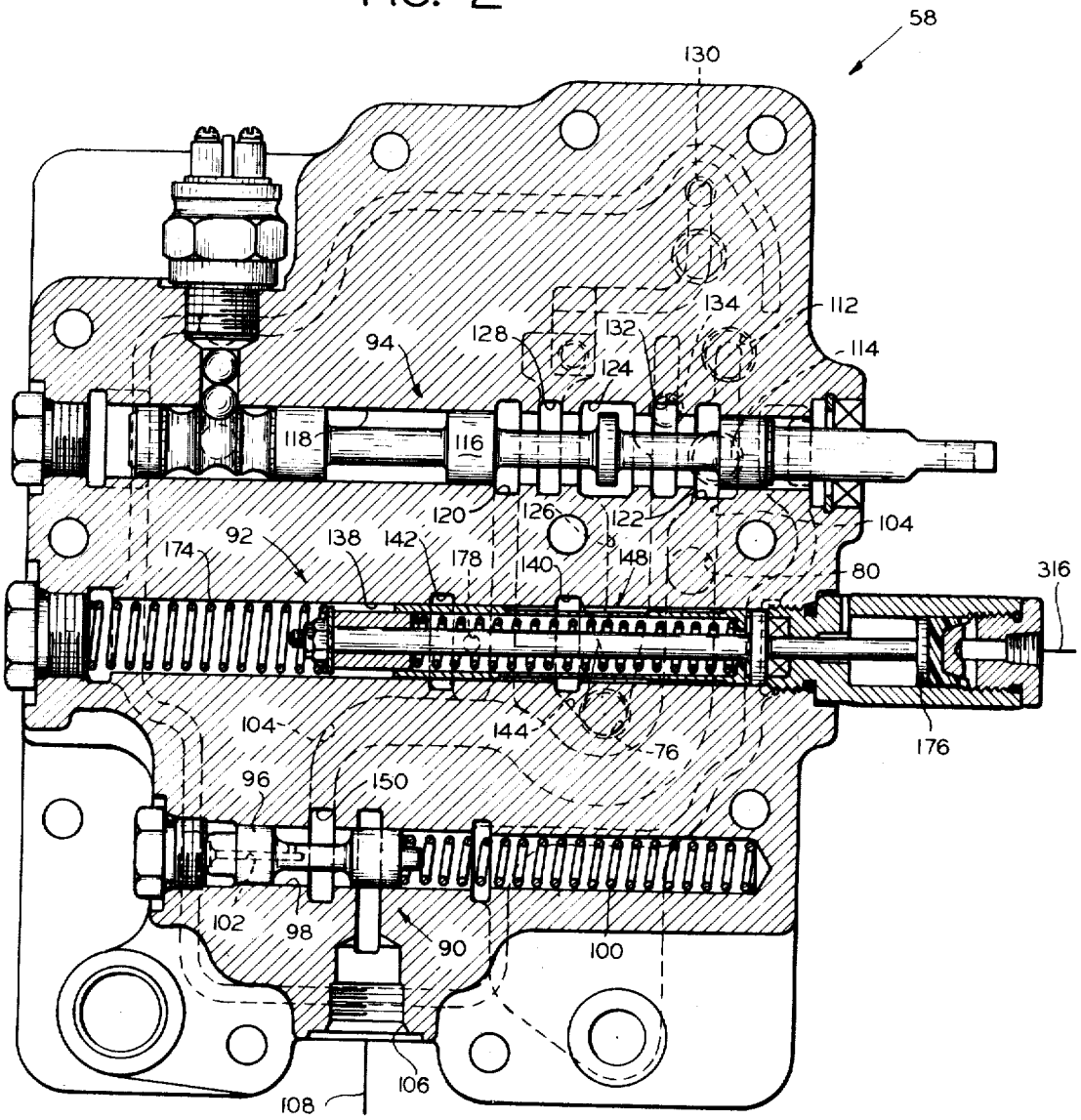
FIG. 2 is a sectional view of the control valve cover which forms a part of the control system.

Referring now also to FIG. 2, control valve cover plate 58 includes a regulating valve 90, an inching valve 92 and a direction control valve 94.

Regulating valve 90 includes a spool 96 slidably disposed in a bore 98 and biased toward the left, as viewed in FIG. 2 by a spring 100. Spool 96 includes a fluid passage 102 therein which communicates with the end of spool opposite spring 100 so that pressurized fluid can be supplied to the end of spool 96 opposite spring 100, thereby causing spool 96 to move toward the right against the bias of spring 100 and regulate fluid flow from a passage 104 which communicates with bore 98 to a port 106 which communicates with bore 98. Regulating valve 90 preferably is adjusted so that the fluid pressure maintained in passage 104 is approximately 150 p.s.i. Also, it will be noted that port 80 communicates with fluid passage 104, and so the pressure of fluid in conduits 74 and 84 is maintained at approximately 150 p.s.i. Also communicating with fluid passage 104 is a pair of ports 112 and 114 which are connected to double-acting fluid motor 62 as will be explained in greater detail subsequently. Connected to port 106 is a fluid conduit 108 which connects with fluid reservoir 24 and includes a cooler 110 disposed so that fluid which passes through regulating valve 90 is directed back to reservoir 24 through cooler 110.

Direction control valve 94 includes a spool 116 slidably disposed in a bore 118 which communicates with fluid passage 104 at grooves 120 and 122. Bore 118 also includes a groove 124 which communicates with a fluid passage 126 that in turn communicates with port 76 so that pressurized fluid from control pump 56 is supplied to bore 118 at groove 124. Bore 118 also includes a groove 128 whch communicates with a port 130 and a groove 132 which communicates with a port 134. With spool 116 in the position shown pressurized fluid supplied to bore 118 via fluid passage 126 is directed to fluid passage 104 so that no significant pressure is developed in the fluid being supplied to ports 130 and 134. When spool 116 is shifted to the right, as viewed in FIG. 2, by means of lever 136 which is attached to the end thereof, spool 116 will cooperate with the grooves in bore 118 so that pressurized fluid from passage 126 is directed to port 130 and port 134 is placed in communication with passage 104 with the result that fluid motor 62 will be actuated to move swash plate 28 of pump 18 in a direction to provide forward drive, as will be explained in more detail later. If spool 116 is moved to the left, as viewed in FIG. 2, pressurized fluid from passage 126 will be directed to port 134 and port 130 will be placed in communication with passage 104 with the result that fluid motor 62 will be acuated to move swash plate 28 of pump 18 in a direction to provide reverse drive.

Figure 3:
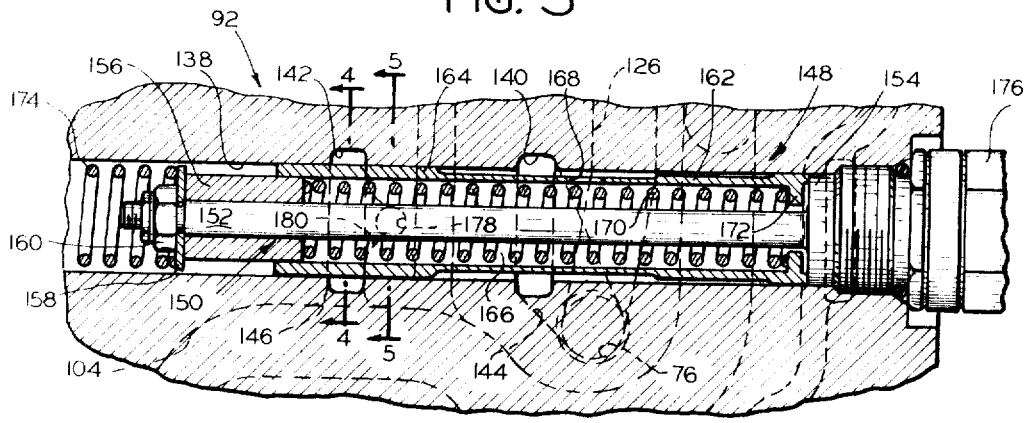
FIG. 3 is an enlarged fragmentary view of the inching valve in the control valve cover shown in FIG. 2.
Figure 4:
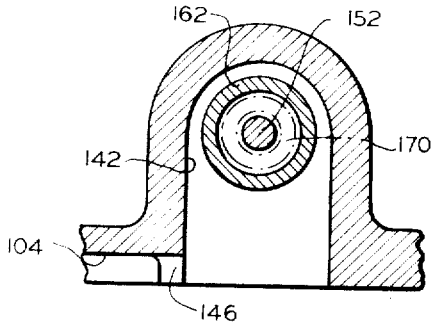
FIG. 4 is a cross-sectional view taken along line 4—4 in FIG. 3.
Figure 5:
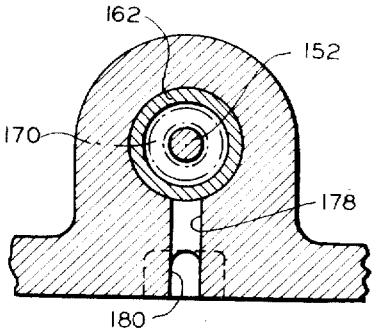
FIG. 5 is a cross-sectional view taken along line 5—5 in FIG. 3.

Referring now also to FIG. 3, inching valve 92 will be described. A more detailed description of this valve may be obtained from U.S. Pat. No. 3,143,127 in which such a valve is described and claimed. Inching valve 92 includes a bore 138 with a pair of grooves 140 and 142 therein. Groove 140 communicates with port 76 and hence passage 126 via a passage 144. Groove 142 communicates with fluid passage 104 via a passage 146. Slidably disposed in bore 138 is a spool 148. Spool 148 includes an inner member 150 having a shaft 152 and a head 154 integral therewith. Carried on shaft 152 is a sleeve 156 which is retained thereon by means of a washer 158 held in place by a nut 160 which threadably engages shaft 152. Spool 148 also includes an outer member 162 which is telescoped over member 150 and includes a land 164 which cooperates with groove 142 to regulate the pressure of fluid in passage 126 by metering fluid past the edge thereof to groove 142 and hence fluid passage 104. Outer member 162 defines with inner member 150, a fluid chamber 166 which is in communication with fluid supplied to bore 138 through groove 140 via an opening 168 in outer member 162. Also, a compression spring 170 is disposed in chamber [162] *166* and engages a shoulder 172 on outer member 162, biasing outer member 162 into engagement with head 154 of inner member 150. At this point it will be seen that pressurized fluid communicated to chamber 166 exerts a force on one end of outer member 162, thereby basing it toward the left, as viewed in FIG. 2 and balancing against the force of spring 170. Thus, the pressure of fluid in chamber 166 and hence supplied to passage 126 depends upon the output of pump 18 and the force necessary to move outer member 162 far enough to the left to meter fluid past land 164 to groove 142 and from there to passage 104. Since spool 148 can be shifted toward the left, as viewed in FIG. 3, against the bias of a compression spring 174 by means of a piston actuator 176, the pressure that will be maintained in passage 126 by inching valve 92 can be regulated from a maximum pressure when spool 148 is in its rightmost position to a minimum pressure (150 p.s.i. controlled by valve 90) when spool 148 is in its leftmost position. Movement of actuator 176 depends upon actuation of the brake system, as will be explained in further detail hereinafter.

Also communicating with bore 138 of inching valve 92 is a fluid passage or opening 178 which communicates with fluid passage 104 via a fluid passage 180, groove 142 and fluid passage 146. Fluid passage 178 serves to provide restricted fluid communication between bore 138 and passage 104 as the edge of land 164 uncovers the end of passage 178. Passage 178 provides for varying the amount of movement of swash plate 28 for a given amount of speed change as the speed of engine 14 changes. This feature of control system 10 will be explained more fully later.

Double-acting fluid motor 62 (FIG. 1A) includes a cylinder 182 which is adapted to be mounted on housing 22 and extend partially into it. Slidably disposed in cylinder 182 is a piston 184 to which a piston rod 186 is connected and which extends through both ends of cylinder 182. One end of piston rod 186 is connected to swash plate 28 of pump 18 by a link 188 so that movement of piston 184 in one direction or the other causes a corresponding movement of swash plate 28 to change the displacement of pump 18. Piston 184 defines with cylinder 182 a pair of chambers 180 and 192. Cylinder 182 includes a pair of ports 194 and 196 which communicate with chamber 190 adjacent the outer end of cylinder 182 and a port 198 which communicates with chamber 190 adjacent piston 184 when piston 184 is centered, as shown in FIG. 1A. Cylinder 182 also includes a pair of ports 200 and 202 which communicate with chamber 192 adjacent the outer end of cylinder 182 and a port 204 which communicates with chamber 192 adjacent piston 184 when it is in its center position, as shown in FIG. 1A. It will be noted that when piston 184 is shifted toward the left that communication between port 198 and chamber 190 is blocked, and similarly when piston 184 is shifted toward the right that communication between port 204 and chamber 192 is blocked.

Port 204 is connected to port 130 in control valve cover plate 58 by a conduit 206 which includes a fluid flow restrictor 208. Also, port 200 is connected to conduit 206 by a conduit 210 in which a one-way valve 212 is disposed which permits fluid flow only from port 200 toward conduit 206. Similarly, port 198 is connected to port 134 in control valve cover plate 58 by a conduit 214 in which a fluid flow restrictor 216 is disposed, and port 194 is connected to conduit 214 by means of a conduit 218 in which a one-way check valve 220 is disposed which permits fluid flow only from port 194 toward conduit 214. Port 196 is connected to port 112 in control valve plate 58 by a conduit 222 in which a one-way check valve 224 is disposed and which permits fluid flow only from port 112 toward port 196. Similarly, port 202 is connected to port 114 in control valve cover plate 58 by means of a conduit 226 in which a one-way valve 228 is disposed and which serves to permit fluid flow only from port 114 toward port 202.

At this point it will be evident that the portion of fluid output from control pump 56 that is directed to branch conduit 72 can, depending upon the position of direction control valve 94, be directed either to chamber 190 via conduit 214 or chamber 192 via conduit 206. If pressurized fluid is supplied to chamber 190, then piston 184 will be shifted toward the right, as viewed in FIG. 1A, and swash plate 28 will be actuated in a negative fluid displacement direction which will drive hydrostatic drive 12 in reverse. On the other hand when pressurized fluid is supplied to chamber 192, then piston 184 and rod 186 will be shifted toward the left, as viewed in FIG. 1A, and swash plate 28 will be actuated in a positive fluid displacement direction. It will be noted that the rate of movement of piston 184 from its centered position will be governed by the rate of fluid flow through restrictors 208 and 216, depending upon which direction piston 184 is being moved. This provides a means for limiting the rate of acceleration of hydrostatic drive 12 since the rate of movement of swash plate 28, and hence the rate of change of the fluid displacement of pump 18 is being controlled.

Spring mechanism 60 includes a cylinder 230 which is mounted on housing 22 and includes a rod 232 which extends through one end of cylinder 230. Rod 232 is connected to swash plate 28 by means of a link 234. Carried by rod 232 is a pair of spring retainers 236 and 238 which are located between a shoulder 240 on rod 232 and a nut threadably engaging rod 232. Disposed between spring retainers 236 and 238 is a pair of compression springs 244 and 246. Springs 244 and 246 normally hold retainer 236 in abutment with one end of cylinder 230 and hold retainer 238 in abutment with a shoulder 248 on cylinder 230. As a result, any movement of swash plate 28 away from its zero displacement or centered position causes a compression of springs 244 and 246. Thus, swash plate 28 cannot move away from its zero displacement position until a force has been applied to it which is high enough to overcome the force of springs 244 and 246 tending to hold swash plate 28 in its zero displacement position.

Figure 6:
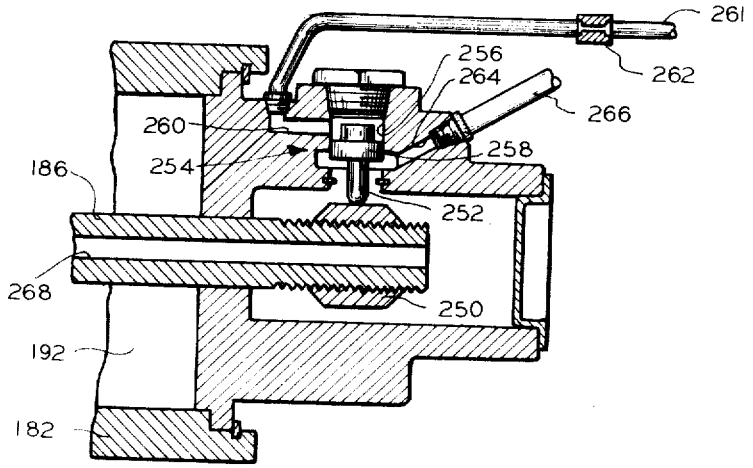
FIG. 6 is a sectional view taken along line 6—6 in FIG. 1A.

Referring now to FIG. 6, the end of piston rod 186 opposite link 188 has a cam 250 mounted thereon which engages a cam follower 252 and serves to actuate valve 254 includes a bore 256 in which a spool 258 is slidably disposed and which includes cam follower 252. Communicating with bore 256 is a fluid passage 260 which is connected to conduit 72 via a conduit 261 which includes a fluid flow restrictor 262. Also communicating with bore 256 is a fluid passage 264 to which a conduit 266 is connected. With swash plate 28 in its zero displacement position piston 184 and piston rod 186 will be in their centered positions, as shown in FIG. 1A, and cam 250 will be in the position shown in FIG. 6 relative to cam follower 252, and so valve 254 will block fluid communication between conduit 72 and conduit 266 and at the same time place conduit 266 in communication with fluid reservoir 24 via fluid passage 268 in piston rod 186 which communicates with the interior of housing 22, and hence fluid reservoir 24. When swash plate 28 of pump 18 has moved a predetermined distance in either direction from its zero displacement position cam follower 252 will move down cam 250 so that valve 254 will be actuated to block fluid communication between conduit 266 and passage 268 and at the same time place fluid conduit 72 in communication with conduit 266 which will cause valve 64 to be actuated, provided valve 94 is in its forward or reverse positions, as will be more fully explained later.

Referring now to FIG. 1B, it will be seen that a valve block 270 with a pair of fluid passages 272 and 274 therein has passage 272 connected to conduit 30 by a conduit 276 and passage 274 connected to conduit 32 by a conduit 278. Disposed in valve block 270 in fluid communication with passages 272 and 274 is a pair of relief valves 280 and 282. Relief valve 280 serves to place conduit 278 in communication with conduit 276 when the pressure of fluid in conduit 32 exceeds a predetermined level, thereby bypassing motor 20. Similarly, relief valve 282 serves to place conduit 276 in fluid communication with conduit 278 when the pressure of fluid in conduit 30 exceeds a predetermined level. As a result damage to hydrostatic drive 12 from excessive pressures is prevented by relief valve 280 and 282.

Figure 7:
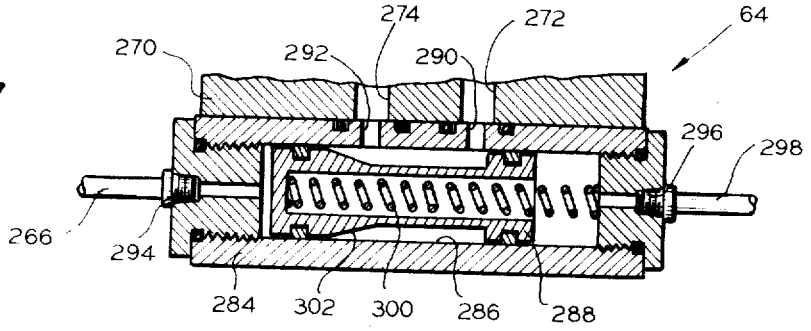
FIG. 7 is a sectional view taken along line 7—7 in FIG. 1B.

Turning now to FIG. 7, valve 64 includes a valve body 284 connected to valve block 270. Located in body 284 is a bore 286 in which a spool 288 is slidably disposed. Disposed in valve body 284 is a pair of openings 290 and 292 which place bore 286 in fluid communication with fluid communication with fluid passages 272 and 274 in valve block 270. The size of openings 290 and 292 is small enough so that they serve as fluid flow restrictors for fluid flowing between passages 272 and 274 via bore 286. Also disposed in valve body 284 is a pair of ports 294 and 296 which communicate with opposite ends of bore 286. Connected to port 294 is the end of conduit 266 remote from valve 254 and connected to port 296 is a conduit 298, the other end of which is connected to conduit 74. Disposed in bore 286 is a compression spring 300 which biases spool 288 toward the end of bore 286 adjacent port 294. It also will be noted that spool 288 is provided with a tapered land 302 so that as spool 288 is shifted toward the right, as viewed in FIG. 7, fluid communication between fluid passages 272 and 274 is gradually cut off. This serves to prevent shock in hydrostatic drive 12 during closing of valve 64.

Figure 8:
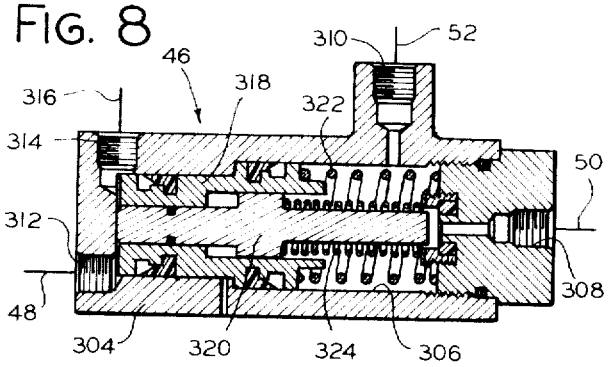
FIG. 8 is a sectional view taken along line 8—8 in FIG. 1A.

Referring next to FIG. 8, combined junction block and sequence valve 46 will be described. For a more detailed description, reference may be had to U.S. Pat. No. 3,381,-783 wherein this device is described in detail and claimed. Combined junction block and sequence valve 46 includes a body 304 having a bore 306 therein with which ports 308, 310, 312 and 314 communicate. Conduit 50 is connected to port 308, conduit 52 is connected to port 310, conduit 48 is connected to port 312 and a conduit 316 is connected at one end to port 314 and is connected at the other end to piston actuator 176 which is associated with inching valve 92.

Slidably disposed in bore 306 of combined junction block and sequence valve 46 is a spool 318 within which another spool 320 is slidably telescoped. Spool 318 is biased toward the left, as viewed in FIG. 8, by a relatively heavy compression spring 322 and spool 320 is biased toward the left, as viewed in FIG. 8, by a relatively light compression spring 324. Thus, when pressurized fluid generated by master cylinder 44 is supplied to port 308 via conduit 50, the pressurized fluid simply passes through bore 306 to conduit 52 via port 310. On the other hand, when pressurized fluid is supplied to port 312 via conduit 48 from master cylinder 42, the pressurized fluid is directed to piston actuator 176 via port 314 and conduit 316. The pressurized fluid actuates inching valve 92 to reduce the pressure of fluid acting on double-acting fluid motor 62 so that spring actuator 60 brings swash plate 28 back toward its zero displacement position, depending upon the amount by which the pressure of the fluidi being supplied to fluid motor 62 is reduced. At the same time as the pressurized fluid being supplied from master cylinder 42 is actuating piston actuator 176 the bias of spring 324 is overcome so that spool 320 shifts toward the right, as viewed in FIG. 8, thereby blocking fluid communication between bore 306 and port 308. After the pressure of fluid being supplied to port 312 reaches a predetermined level, then the bias of spring 322 will be overcome so that spool 318 will move toward the right, as viewed in FIG. 8, thereby forcing fluid out of bore 306 and through conduit 52 to apply brakes 40.

Referring back now to FIG. 1A, there is shown a valve 326 which may optionally be included in control system 10 and which serves to prevent stalling engine 14 in the event of a panic stop when master cylinder 44 is used to apply brakes 40. Valves 326 includes a body 328 with a bore 330 therein in which a spool 32 is slidably disposed and biased to the left, as viewed in FIG. 1A, by a compression spring 334. Disposed in valve body 328 and communicating with bore 330 are three ports 336, 338 and 340. Port 336 is connected to conduit 50 by a conduit 342 so that pressurized fluid generated by master cylinder 44 serves to move spool 332 toward the right against the bias of spring 334. Port 338 is connected to conduit 226 downstream from one-way valve 228 by means of a conduit 344, and similarly port 340 is connected to conduit 222 downstream from one-way valve 224 via a conduit 346. Spool 332 normally is biased by spring 334 to a position in which communication between conduit 344 and 346 is blocked; however, upon the generation of sufficient fluid pressure by master cylinder 44 spool 332 will be shifted toward the right, as viewed in FIG. 1A, against the bias of spring 334 and open communication between conduits 344 and 346. When this occurs the effect is to place fluid chambers 190 and 192 of fluid motor 62 in communication whereby spring mechanism 60 can quickly return swash plate 28 of pump 18 to its zero displacement position. As a result, the stalling of engine 14 due to a panic stop is prevented.

In order to enable others to better understand our invention, we will now explain the operations of it.

Idle

With engine 14 running at idle speed, approximately 500 r.p.m., pump 18 is rotating but is not generating any pressurized fluid because swash plate 28 is at its zero displacement position and control pump 56 is supplying pressurized fluid to conduit 70 and branch conduits 72 and 74. Branch conduit 74 communicates with regulator valve 90 via fluid passage 104, and so the pressure in conduits 74 and 84 is maintained at approximately 150 p.s.i. Pressurized fluid from control pump 56 which is supplied to fluid passage 104 via conduit 74 also is supplied to chambers 190 and 192 of motor 62 via conduits 222 and 226, respectively.

Neutral

With direction control valve 94 disposed in the position shown in FIG. 2, control system 10 is in its neutral condition. That is, any pressurized fluid generated by control pump 56 which is delivered to direction control valve 94 via branch conduit 72 and fluid passage 126 is directed to fluid passage 104 and then back to fluid reservoir 24 via regulating valve 90 and cooler 110. Consequently, regardless of the speed of engine 14, and thus the output of pump 56, the fluid being delivered to direction control valve 94 will not cause any actuation of double-acting fluid motor 62. At this point it will be noted that a positive neutral is provided for hydrostatic drive 12 through valve 64. If, by chance, control system 10 is slightly out of adjustment so that swash plate 28 is not returned fully to its zero displacement position by spring actuator 60, then, whenever engine 14 is running, pump 18 will be circulating some fluid. However, any buildup of pressure is prevented by valve 64 which is open, as shown in FIG. 7, in the neutral condition of control 10 and which serves to short circuit fluid motor 20 with the result that the slight amount of fluid being circulated by pump 18 due to a misadjustment of spring actuator 60 will not result in sufficient pressure being generated to drive fluid motor 20.

Forward Drive

Control system 10 is conditioned for forward drive simply by the operator manipulating lever 136 to shift spool 116 of direction control valve 94 toward the right, as viewed in FIG. 2, so that pressurized fluid supplied to fluid passage 126 is directed to port 130 and hence to chamber 192 of fluid motor 62 via conduit 206 and flow restrictor 208. Also, fluid passage 104 is connected to port [132] *134* and hence fluid chamber 190 of fluid motor 62 via conduit 214 and flow restrictor 216. With engine 14 running at idle speed, approximately 500 r.p.m., the force generated by pressurized fluid supplied to chamber 192 is not sufficient to overcome the force of spring actuator 60 holding swash plate 28 of pump 18 in its zero displacement position. As the operator manipulates foot throttle 15 to increase the speed of engine 14 the output of pump 56 increases in direct proportion to the increase in speed of engine 14, and so the pressure of fluid being supplied to chamber 192 increases. As the pressure in chamber 192 increases the force of spring actuator 60 is overcome with the result that swash plate 28 moves away from its zero displacement position to a positive displacement position. As a result pump 18 will begin generating pressurized fluid in conduit 32 and drive motor 20. During initial movement of swash plate 28 valve 64 still is open so that a portion of the pressurized fluid being generated by pump 18 is bypassing motor 20 through valve 64. As a result hydrostatic drive 12 starts very smoothly from idle.

As the speed of engine 14 increases the pressure of fluid being supplied to chamber 192 increases in direct proportion, thereby causing piston 184 to move further toward the left and further displace swash plate 28 from its zero displacement position. This further leftward movement of piston 184 results in cam follower 252 moving down cam 250 so that valve 254 is actuated to place fluid passage 260 in communication with conduit 266. When this occurs, pressurized fluid from conduit 72 flows through restrictor 262 and hence via conduit 266 to valve 64 where it acts on spool 288 to cause it to move to the right, as viewed in FIG. 7, against the bias of spring 300 and the force exerted by pressurized fluid from conduit 74 acting on spool 288, thereby blocking fluid communication between openings 290 and 292 and hence conduits 30 and 32 so that a portion of the output from pump 18 is no longer bypassing motor 20. The speed at which valve 64 closes is limited by the action of restriction 262 and taper 302 as well as spring 300 and the pressurized fluid from conduit 74 so that there is no shock imparted to hydrostatic drive 12 due to valve 64 closing too quickly.

Figure 9:
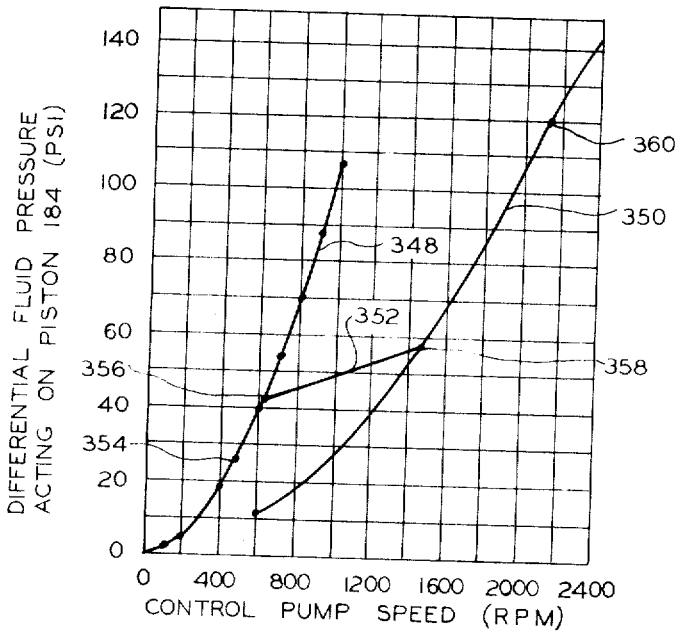
FIG. 9 is a graph showing the differential pressure of fluid acting on the piston in the double-acting fluid motor connected to the swash plate of the main pump plotted against engine speed.

Continued increase in speed of engine 14 continues to increase the output of control pump 56 and therefore increases the pressure of fluid supplied to chamber 192, causing piston 184 to move further to the left against the bias of [fluid] *spring* actuator 60, the inherent returning force of pump 18 which acts on swash plate 28 and the force caused by the pressure of fluid (150 p.s.i.) being supplied to chamber 190 via conduit 222. It will be noted that the pressure generated by control pump 56 also is acting on outer member 162 of inching valve 92, causing it to move toward the left, as viewed in FIG. 3, against the bias of spring 170. When the pressure generated by control pump 58 is sufficiently high enough, outer member 162 will move sufficiently far enough toward the left so that land 164 begins to uncover opening 178, thereby permitting a portion of the fluid output from control pump 56 to now be directed back to reservoir 24 via opening 178 and fluid passage 104. Thus, as opening 178 is uncovered, the amount that swash plate 28 is moved away from its zero displacement position in relation to an increase in the speed of engine 14 decreases. This aspect of control system 10 can more readily be understood by referring to FIG. 9. Referring now to FIG. 9, the curve 348 shows the differential pressure in either chamber 190 or 192 in relation to the output of control pump 56 in the situation where opening 178 is not provided in bore 138 of inching valve 92. On the other hand, curve 350 shows the differential pressure in chambers 190 and 192 in relation to control pump speed in the situation where opening 178 is continually in parallel circuit with restriction 78. Curves 348 and 350 are connected by a straight line 352 which represents opening 178 being uncovered by land 164. With control pump running at 500 r.p.m. (engine idle speed) differential pressure in chambers 190 and 192 will be approximately 25 p.s.i. as indicated at point 354 on curve 348. As the speed of control pump 56 increases the differential pressure in chambers 190 and 192 increases rapidly up to approximately 42 p.s.i., as indicated by point 356 on curve 348. At this point of time land 164 begins to uncover opening 178 so that a further increase in the speed of control pump 56 causes a more gradual increase in the differential pressure acting on piston 184 as indicated by line 352 until it reaches curve 350 at point 358 at which time opening 178 is completely uncovered by land 164. Further increase in the speed of control pump 56 up to the maximum governed speed of engine 14 (2100 r.p.m.) results in an increase in differential pressure acting on piston 184 up to a maximum differential pressure of 120 p.s.i. as indicated at point 360 on curve 350.

Figure 10:
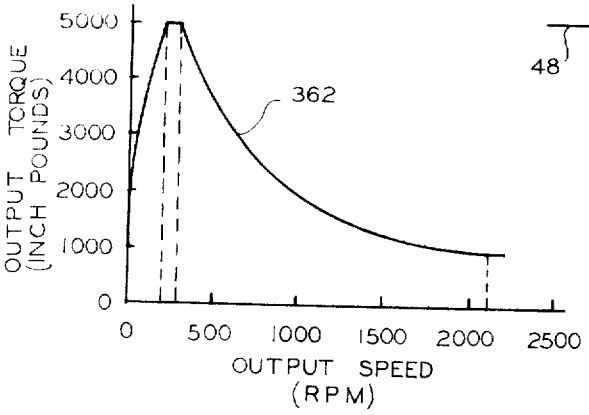
FIG. 10 is a graph showing output torque plotted against output speed of the hydrostatic drive.

The relationship of the displacement of swash plate 28 relative to the speed of engine 44 is such that hydrostatic drive 12 produces an output torque in relation to output speed as shown by curve 362 on the graph in FIG. 10.

Further, it will be noted that regardless of the acceleration of engine 14, and hence the rate of increase in the volumetric output of control pump 56 that restrictor 208 limits the rate of fluid flow through conduit 206 to chamber 192, and so limits the rate of displacement of swash plate 28 from is zero displacement position with the result that the acceleration of hydrostatic drive 12 and the vehicle associated therewith is thereby limited, regardless of the acceleration of engine 14.

Assuming now that engine 14 is running at a constant speed of 2000 r.p.m. and that the vehicle associated with hydrostatic drive starts to climb a ramp, the load imposed on motor 20 will increase which in turn will result in an increase in load being imposed on pump 18 through an increase in the pressure in conduit 32. Consequently, the inherent force acting on swash plate 28 intending it to return the swash plate to its zero displacement position will increase in response to the increase in pressure that pump 18 will have to generate to compensate for the increase in the pressure in conduit 32. Consequently, the acting on swash plate 28 will tend to offset the force exerted by fluid motor 62 and move swash plate 28 in a direction back toward its zero displacement position until the inherent forces of pump 18 acting on swash plate 28 are reduced to balance the continuing force of fluid motor 62. At this point it will be apparent that control system 10 is responsive to torque demand on hydrostatic drive 12 and acts to change the torque output of hydrostatic drive 12 for a given speed of engine 14 in relation to load.

Deceleration

When the operator wishes to decelerate hydrostatic drive 12 he simply reduces the speed of engine 14 which reduces the differential fluid pressure acting on piston 184. Assuming, for example, that the operator wishes to coast to a stop he simply takes his foot off throttle pedal 15, thereby permitting engine 14 and hence control pump 56 to run at idle speed (500 r.p.m.) with the result that there is no differential fluid pressure being exerted on piston 184. Swash plate 28 is then returned to its zero displacement position at a rate which is determined by the force of spring actuator 60 acting against the force generated by the back pressure of fluid in chamber 192 being forced out of chamber 192 past flow restrictor 208 and the inherent force of pump 18, which under deceleration conditions is acting as a motor, and so is tending to move swash plate 28 away from its zero displacement position.

Direction Reversal

In the event of a direction reversal, for example, from full forward speed of hydrostatic drive 12 to full reverse speed of hydrostatic drive 12 which would be accomplished by having engine 14 running at maximum governed speed and then shifting direction control valve 94 from its forward direction control position, toward the right as viewed in FIG. 2, to its reverse control position toward the left, as viewed in FIG. 2, there is a controlled rate of deceleration and then a controlled rate of acceleration, thereby eliminating any abrupt direction reversal and any shocks that otherwise might accompany such a reversal. With control system 10 operating hydrostatic drive 12 at maximum forward speed piston 184 will be shifted to the left end of cylinder 182 of fluid motor 62, thereby blocking communication between chamber 190 and port 198. Now, when direction control valve 94 is shifted to condition control system 10 for reverse drive pressurized fluid from control pump 56 will no longer be supplied to chamber 192 via conduit 206, but will be supplied to conduit 214. However, fluid supplied to conduit 214 will be blocked from immediate communication with chamber 190 due to port 198 being blocked by piston 184. Thus, the return of swash plate 28 to substantially its zero displacement position will depend upon the bias of spring actuator 60 acting against the back pressure of fluid being forced out of chamber 192 via conduit 210 and valve 212 past flow restrictor 208 and the inherent force of pump 18, which under deceleration conditions is acting as a motor, and so is tending to move swash plate 28 away from its zero displacement position. As direction control valve 94 passes through its neutral position the fluid pressure in conduit 261 drops to the same pressure as in conduit 298 with the result that spring 300 shifts spool 288 to open valve 64 and short circuit motor 20. Because of the resistance to fluid flow due to fluid flow restrictor 262 in conduit 261 cam follower 252 will have moved up cam 250 as swash plate 28 approaches its zero displacement position to place conduit 266 in fluid communication with passage 268 and hence reservoir 24 before fluid pressure in conduit 261 can build up sufficiently to again actuate valve 64 to close. Also, as swash plate 28 approaches its zero displacement position piston 184 uncovers port 198 so that circuit 214 now can supply pressurized fluid from control pump 56 to chamber 190, thereby causing fluid motor 62 to actuate swash plate 28 past its zero displacement position in a negative displacement direction and continuing to full displacement as determined by the output of control pump 56 which is being driven at maximum governed speed of engine 14. The rate at which swash plate 28 moves to maximum negative displacement position is governed by the rate of fluid flow to chamber 190 past flow restrictor 216.

Inching

Sometimes it is desirable, for example, in a forklift truck to move the vehicle forward or rearwardly slowly while running the engine at a high rate of speed. This particular mode of operation can be accomplished by depressing foot throttle 15 to run engine 14 at a high rate of speed while at the same actuating master cylinder 42 to supply pressurized fluid to combined junction block and sequence [block] *valve* 46. Initial pressure fluid from master cylinder 42 is directed through conduit 314 to piston actuator 176 which causes spool 148 of inching valve 92 to shift toward the left against the bias of spring 174 so that the edge of land 164 uncovers groove 142 to bypass fluid from control pump 56 back to fluid passage 104, whereby the differential pressure acting on piston 184 drops substantially, depending upon the extent to which spool 248 is moved toward the left, and swash plate 28 of pump 18 moves back toward its zero displacement position, thereby decreasing the output speed of hydrostatic drive 12 while maintaining engine speed 14 at a high level. Combined junction block and sequence valve 46 is arranged so that when inching valve 92 is actuated to bring swash plate 28 substantially back to its zero displacement position that further actuation of master cylinder 42 then causes pressurized fluid to be supplied to brakes 40, thereby causing them to be applied.

Panic Stop

In the event that it is desired to stop rapidly the vehicle associated with hydrostatic drive 12, the operator need only quickly and fully actuate master cylinder 44 which supplies pressurized fluid to brakes 40 via conduit 50, combined junction block and sequence valve 46 and conduit 52. At the same time pressurized fluid from master cylinder 44 is supplied via a conduit 342 to valve 326 causing it to open and place conduits 344 and 346 in fluid communication so that fluid chambers 190 and 192 of fluid motor 62 are placed in direct communication with each other. Consequently, swash plate 28 of pump 18 will be returned to its zero displacement position through the action of the force of spring actuator 60 and the inherent force of pump 18 tending to restore swash plate 28 to its zero displacement position. It will be noted that either of these forces have to overcome back pressure of fluid being forced out of one of chamber 192, assuming that the hydrostatic drive was initially conditioned for forward drive, past flow restrictor 208 since chambers 190 and 192 are placed in direct communication with each other. Thus, stalling of engine 14 is prevented since swash plate 28 is returned rapidly to its zero displacement position.

Reverse Drive

In order to operate hydrostatic drive 12 in a reverse direction control valve 94 is actuated through manipulation of lever 136 so that spool 116 is shifted toward the left, as viewed in FIG. 2, whereby pressurized fluid from fluid passage 126 is directed to port 134, and hence via fluid conduit 214 to fluid chamber 190. Therefore, as the speed of engine 14, and hence output pump 56 increases the fluid motor 62 is actuated to shift piston 184 toward the right, as viewed in FIG. 1A, thereby moving swash plate 28 in a negative displacement direction. Otherwise, the operation of control system 10 is exactly the same as described hereinabove for forward drive of hydrostatic drive 12.

While only a single preferred embodiment of our invention, together with an optional valve associated therewith to prevent engine stall during panic stops, has been disclosed, it will be understood that this description is intended to be illustrative only and that various modifications and changes can be made to our invention without departing from the spirit and scope of it. Therefore, the limits of our invention should be determined from the appended claims.

We claim:

1. The combination comprising a fluid reservoir, an engine, a variable displacement fluid pump drivingly connected to said engine, a fluid motor drivingly connected to said pump, said pump having a movable member for controlling the displacement of said pump and which tends to return to its zero displacement position with a force which increase as said movable member is actuated away from its zero displacement position and increases as the load imposed on said pump by said motor increases, means connected to said movable member for resiliently biasing said movable member to its zero displacement position, and means connected to said movable member and responsive to the speed of said engine for actuating said movable member away from its zero displacement position with increasing force as the speed of said engine increases, said actuating and return forces being opposed to each other so that when the speed of said engine remains constant the displacement of said pump varies in inverse proportion to the load on said pump.

2. The combination as set forth in claim 1 including means connected to said actuating means for varying the amount which the actuating force increases relative to an increase of said engine speed after the actuating force reaches a predetermined level.

3. The combination as set forth in claim 1 wherein said actuating means includes means for limiting the speed of movement of said movable member away from its zero displacement position.

4. The combination as set forth in claim 1 including a brake system and means connected to said actuating means and responsive to a predetermined actuation of said brake system for reducing the force being exerted by said actuating means to move said movable member away from its zero displacement position.

5. The combination as set forth in claim 1 wherein said actuating means includes a control pump drivingly connected to said engine, a double-acting fluid motor connected to said movable member, fluid passage means connected to said control pump and said double-acting fluid motor for supplying pressurized fluid to said double-acting fluid motor.

6. The combination as set forth in claim 1 wherein said actuating means includes a control pump and a first fluid flow restrictor connecting said control pump to said reservoir.

7. The combination as set forth in claim 6 including a second fluid flow restrictor connected in parallel with said first fluid flow restrictor and a normally closed valve connected between said second fluid flow restrictor and said control pump, said normally closed valve being operable when the output of said control pump reaches a predetermined pressure to open and place said second fluid flow restrictor in communication with said control pump.

8. The combination as set forth in claim 7 including a brake system, said normally closed valve also being operable in response to a predetermined actuation of said system to decrease the force of said actuating means.

9. The combination as set forth in claim [1] *5* wherein said actuating means includes means for limiting the speed of movement of said movable member toward its zero displacement position.

10. The combination as set forth in claim 9 including a brake system having junction means, fluid pressure actuated brake means connected to said junction means, first fluid pressure generating means connected to said junction means and second fluid pressure generating means connected to said junction means, said junction means being operable to direct pressure fluid to said brake means upon actuation of either said first generating means or said second generating means, means connected to said actuating means and said first generating means and responsive to a predetermined fluid pressure generated by said first generating means for bypassing said means for limiting the speed of movement of said movable member toward its zero displacement position, and means connected to said actuating means and said second generating means and responsive to a predetermined fluid pressure generated by said second generating means for reducing the force being exerted by said actuating means to move said movable member away from its zero displacement position.

11. The combination as set forth in claim 9 including a brake system and means connected to said actuating means and responsive to a predetermined actuation of said brake system for bypassing said means for limiting the speed of movement of said movable member toward its zero displacement position.

12. The combination as set forth in claim 11 including a brake system and an inching valve connected to said fluid passage means and responsive to actuation of said brake system for bypassing fluid from said control pump to said reservoir so that the pressure of fluid being supplied to said double-acting fluid motor decreases as actuation of said brake system increase beyond a predetermined level.

13. The combination as set forth in claim 9 wherein said double-acting fluid motor includes first and second members, said first member being movable relative to said second member and defining with said second member first and second chambers.

14. The combination as set forth in claim 13 wherein said double-acting fluid motor includes first and second ports which communicate with said first chamber and third and fourth ports which communicate with said second chamber, said second port being disposed so that a predetermined movement of said first motor member in one direction from a first position blocks communication between said second port and said first chamber and said third port being disposed so that a predetermined movement of said first motor member in the opposite direction from said first position blocks communication between said third port and said second chamber, and said fluid passage means includes a direction control valve having fifth and sixth ports, said control valve being connected to said control pump and said reservoir and operable to direct fluid from said control pump to said fifth port, said sixth port or said reservoir, a first fluid conduit connecting said fifth port and said second port, a second fluid conduit connecting said sixth port and third port, a first one-way valve connecting said first conduit and said first port for fluid flow only from said first chamber toward said first conduit and a second one-way valve connecting said second conduit and said fourth port for fluid flow only from said second chamber toward said second conduit.

15. The combination as set forth in claim 13 including a brake system and a normally closed valve connected to said [chamber] *chambers* and operable in response to a predetermined actuation of said brake system to open and place said chambers in fluid communication with each other.

16. The combination as set forth in claim 14 wherein said fluid passage means includes a first fluid flow restrictor disposed in said first conduit and a second fluid flow restrictor disposed in said second conduit.

17. The combination as set forth in claim 1 wherein said fluid motor and pump are drivingly connected by first and second fluid passage means and including third fluid passage means connecting said first and second fluid passage means, said third fluid passage means including a normally open valve, and means connected to said valve and responsive to the position of said movable member for closing said valve when said movable member passes a predetermined position.

18. The combination as set forth in claim 17 wherein said third fluid passage means includes fluid flow restricting means.

19. The combination as set forth in claim 1 wherein said fluid motor and pump are drivingly connected by first and second fluid passage means and including third fluid passage means connecting said first and second fluid passage means, said third fluid passage means including a normally open valve, and means connected to said valve and said actuating means for closing said valve when said actuating means moves past a predetermined position.

20. The combination as set forth in claim 19 wherein said third fluid passage means includes fluid flow restricting means.

21. The combination as set forth in claim 20 wherein said actuating means includes a double-acting fluid motor and said closing means includes a fluid conduit connected to said valve and a two-position valve connected to said fluid conduit, said actuating means and said reservoir and operable to place said fluid conduit in communication with said reservoir until said double-acting fluid motor moves past a predetermined position and then places said fluid conduit in communication with said actuating means.

22. The combination as set forth in claim 21 wherein said closing means includes [second] *a* fluid flow restricting means disposed to restrict fluid flow from said actuating means to said fluid conduit.

References Cited

The following references, cited by the Examiner, are of record in the patented file of this patent or the original patent.

UNITED STATES PATENTS

| | | | |
|---|---|---|---|
| 2,382,437 | 8/1945 | Molly | 60—418 X |
| 3,054,263 | 9/1962 | Budzich et al. | 60—447 |
| 3,429,123 | 2/1969 | Burroughs | 60—450 |
| 3,371,479 | 3/1968 | Yapp et al. | 60—445 |

EDGAR W. GEOGHEGAN, Primary Examiner

U.S. Cl. X.R.

60—445, 449